US008214661B2

(12) United States Patent
Cooper et al.

(10) Patent No.: US 8,214,661 B2
(45) Date of Patent: Jul. 3, 2012

(54) USING A CONTROL POLICY TO IMPLEMENT POWER SAVING FEATURES

(75) Inventors: Alastair Cooper, Hampshire (GB); Robert B. Nicholson, Hampshire (GB)

(73) Assignee: International Business Machines Corporation, Armonk, NY (US)

(*) Notice: Subject to any disclaimer, the term of this patent is extended or adjusted under 35 U.S.C. 154(b) by 566 days.

(21) Appl. No.: 12/374,258

(22) PCT Filed: May 31, 2007

(86) PCT No.: PCT/EP2007/055361
§ 371 (c)(1), (2), (4) Date: Jan. 16, 2009

(87) PCT Pub. No.: WO2008/009510
PCT Pub. Date: Jan. 24, 2008

(65) Prior Publication Data
US 2010/0017632 A1  Jan. 21, 2010

(30) Foreign Application Priority Data
Jul. 21, 2006 (GB) .................. 0614515.5

(51) Int. Cl.
*G06F 1/00* (2006.01)
*G06F 1/26* (2006.01)
*G06F 1/32* (2006.01)
*G06F 13/00* (2006.01)
*G06F 13/28* (2006.01)

(52) U.S. Cl. ........ 713/300; 713/320; 713/324; 711/111; 711/112

(58) Field of Classification Search .............. 713/300, 713/320, 324; 711/111, 112
See application file for complete search history.

(56) References Cited

U.S. PATENT DOCUMENTS

| | | | | |
|---|---|---|---|---|
| 6,012,124 A * | 1/2000 | Kamo et al. | ................. | 711/114 |
| 6,684,339 B1 * | 1/2004 | Willig | ............................ | 713/300 |
| 6,742,097 B2 * | 5/2004 | Woo et al. | ..................... | 711/170 |
| 6,892,313 B1 * | 5/2005 | Codilian et al. | .............. | 713/323 |

(Continued)

FOREIGN PATENT DOCUMENTS

EP  1892626 A2 *  2/2008

(Continued)

OTHER PUBLICATIONS

Huang et al., "Power Consumption of Virtual Machine Live Migration in Clouds," Communications and Mobile Computing (CMC), 2011 Third International Conference on , pp. 122-125, Apr. 18-20, 2011.*

(Continued)

*Primary Examiner* — Faisal M Zaman
(74) *Attorney, Agent, or Firm* — Francis Lammes; Stephen J. Walder, Jr.; Randall J. Bluestone

(57) ABSTRACT

Managing power-consumption, for use in a storage system comprising first data stored on one or more storage devices is provided. A receiver receives a policy comprising a power-management parameter, a first parameter and a rule associated with the policy. An analyser, responsive to receipt of a policy, analyzes second data associated with the rule. A determiner, responsive to the analysis, determines third data in accordance with the second data. The third data is associated with migration of the first data.

18 Claims, 7 Drawing Sheets

U.S. PATENT DOCUMENTS

| | | | |
|---|---|---|---|
| 6,938,174 B2* | 8/2005 | LeKuch et al. | 713/320 |
| 7,093,147 B2* | 8/2006 | Farkas et al. | 713/320 |
| 7,237,127 B2* | 6/2007 | Chao et al. | 713/320 |
| 7,340,616 B2 | 3/2008 | Rothman et al. | |
| 7,533,281 B2* | 5/2009 | Hsieh | 713/310 |
| 7,549,021 B2* | 6/2009 | Warren, Jr. | 711/119 |
| 7,568,075 B2 | 7/2009 | Fujibayashi et al. | |
| 7,861,098 B2* | 12/2010 | Theocharous et al. | 713/300 |
| 7,962,704 B2* | 6/2011 | Fujibayashi et al. | 711/154 |
| 2003/0126475 A1* | 7/2003 | Bodas | 713/300 |
| 2004/0268166 A1* | 12/2004 | Farkas et al. | 713/320 |
| 2005/0033996 A1* | 2/2005 | Fong et al. | 713/300 |
| 2005/0066206 A1 | 3/2005 | Beers et al. | |
| 2005/0138284 A1* | 6/2005 | Cohn et al. | 711/114 |
| 2005/0144486 A1* | 6/2005 | Komarla et al. | 713/300 |
| 2005/0177712 A1* | 8/2005 | Kadi | 713/150 |
| 2005/0268121 A1* | 12/2005 | Rothman et al. | 713/300 |
| 2005/0283624 A1* | 12/2005 | Kumar et al. | 713/300 |
| 2006/0005057 A1* | 1/2006 | Nalawadi et al. | 713/320 |
| 2006/0036878 A1* | 2/2006 | Rothman et al. | 713/300 |
| 2006/0047493 A1* | 3/2006 | Gooding | 703/18 |
| 2006/0117160 A1* | 6/2006 | Jackson et al. | 711/170 |
| 2007/0067559 A1 | 3/2007 | Fujibayashi et al. | |
| 2008/0005516 A1* | 1/2008 | Meinschein et al. | 711/165 |
| 2009/0119523 A1* | 5/2009 | Totten | 713/322 |
| 2009/0119530 A1* | 5/2009 | Fisk et al. | 713/324 |
| 2009/0240992 A1* | 9/2009 | Ishii et al. | 714/48 |
| 2010/0241818 A1* | 9/2010 | Elliott et al. | 711/162 |

FOREIGN PATENT DOCUMENTS

| | | |
|---|---|---|
| JP | 03103918 A * | 4/1991 |
| JP | 2008083845 A * | 4/2008 |
| JP | 2010073190 A * | 4/2010 |
| WO | WO2008/009510 A1 | 1/2008 |
| WO | WO 2009120427 A1 * | 10/2009 |

OTHER PUBLICATIONS

Hasebe et al., "Power-Saving in Large-Scale Storage Systems with Data Migration," Cloud Computing Technology and Science (CloudCom), 2010 IEEE Second International Conference on , pp. 266-273, Nov. 30 2010-Dec. 3 2010.*

De La Luz et al., "Reducing memory energy consumption of embedded applications that process dynamically allocated data," Computer-Aided Design of Integrated Circuits and Systems, IEEE Transactions on , vol. 25, No. 9, pp. 1855-1860, Sep. 2006.*

Ye et al., "Virtual Machine Based Energy-Efficient Data Center Architecture for Cloud Computing: A Performance Perspective," Green Computing and Communications (GreenCom), 2010 IEEE/ACM Int'l Conference on & Int'l Conference on Cyber, Physical and Social Computing (CPSCom) , pp. 171-178, Dec. 18-20, 2010.*

Pinheiro, Eduardo et al., "Energy Conservation Techniques for Disk Array-Based Servers", Proceedings of the 18th Annual International Conference on Supercomputing, Malo, France, Jun. 26, 2004, pp. 68-78.

EPO Examination Report dated Nov. 16, 2009, Application No. 07 729 762.0, 7 pages.

EPO Response to Examination Report, Application No. 07 729 762.0, Mar. 16, 2010, 8 pages.

* cited by examiner

USING A CONTROL POLICY TO IMPLEMENT POWER SAVING FEATURES

BACKGROUND

The present invention relates to an apparatus for managing power-consumption.

Large computing systems are very power-intensive, consuming electricity in huge quantities as disks, servers etc. remain powered on. This is because customers often want a high-availability, high-performance and high-reliability service.

It is desirable for owners of these systems to conserve power, thereby minimising the impact on energy sources and also minimising running costs.

In the prior art, an algorithm for power management can be executed in a computing system. The algorithm places frequently used data on a subset of available disks, such that the remaining disks hold less frequently used data. The algorithm achieves power savings because the disks that hold less frequently used data can be operated in power saving modes. For example, these disks can be spun down and only spun up occasionally in order to service an infrequent data access.

Disadvantageously, by concentrating frequently used data on a subset of available disks, the useable I/O processing capacity of the computing system is reduced. As the I/O workload increases, the disks that hold frequently used data will reach the limit of their I/O processing capacity. As this limit is approached, a user will experience increasingly longer I/O wait times and thus, performance will degrade.

A solution to this problem is to distribute frequently used data over several available disks in order to maximise the effective I/O processing capacity of the computing system.

Thus, the skilled person is faced with a conflict: in order to minimise power consumption, frequently used data should by concentrated on a minimum number of disks and in order to maximise performance, frequently used data should by distributed over a maximum amount of disks.

There is a need for an improved power management mechanism that can be implemented whilst minimising impact on customer service levels.

SUMMARY

In one illustrative embodiment, an apparatus is provided for managing power-consumption, for use in a storage system comprising first data stored on one or more storage devices. A receiver receives a policy comprising a power-management parameter, a first parameter and a rule associated with the policy. An analyser, responsive to receipt of the policy, analyzes second data associated with the rule. A determiner, responsive to the analysis, determines third data in accordance with the second data. In the illustrative embodiment the third data is associated with migration of the first data.

In another illustrative embodiment a method is provided for managing power-consumption, for use in a storage system comprising first data stored on one or more storage devices. The method comprises receiving a policy comprising a power-management parameter, a first parameter and a rule associated with the policy. The method further comprises analysing, in response to receiving the policy, second data associated with the rule and determining, in response to analysing the second data, third data in accordance with the second data. In the illustrative, the third data is associated with migration of the first data.

In another illustrative embodiment a computer program comprises a computer recordable medium having a computer readable program recorded thereon. The computer readable program, when loaded into a computer system and executed thereon, causes the computer system to receive a policy comprising a power-management parameter, a first parameter and a rule associated with the policy, analyze, in response to receiving the policy, second data associated with the rule, and determine, in response to the analyzing the second data, third data in accordance with the second data. In the illustrative, the third data is associated with migration of the first data.

These and other features and advantages of the present invention will be described in, or will be come apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments are described herein in the context of storage systems in a storage area network with access to storage by host computers being controlled by a controller component. Also, the illustrative embodiments can be applied in storage architectures with communication between two storage controllers.

A storage area network (SAN) is a network whose primary purpose is the transfer of data between computer systems and storage elements. In a SAN, storage devices are centralised and interconnected. A SAN is a high-speed network that allows the establishment of direct communications between storage devices and host computers within the distance supported by the communication infrastructure. A SAN can be shared between servers or dedicated to one server. It can be local or geographically distributed.

SANs enable storage to be externalised from the servers and centralised elsewhere. This allows data to be shared among multiple servers. Data sharing enables access of common data for processing by multiple computer platforms or servers.

The host server infrastructure of a SAN can include a mixture of server platforms. The storage infrastructure includes storage devices which are attached directly to the SAN network. SANs can interconnect storage interfaces together into many network configurations.

Virtualization is the separation of the logical view of storage from its physical implementation enabling physical changes to be made without changing the logical view.

Figure 1A:
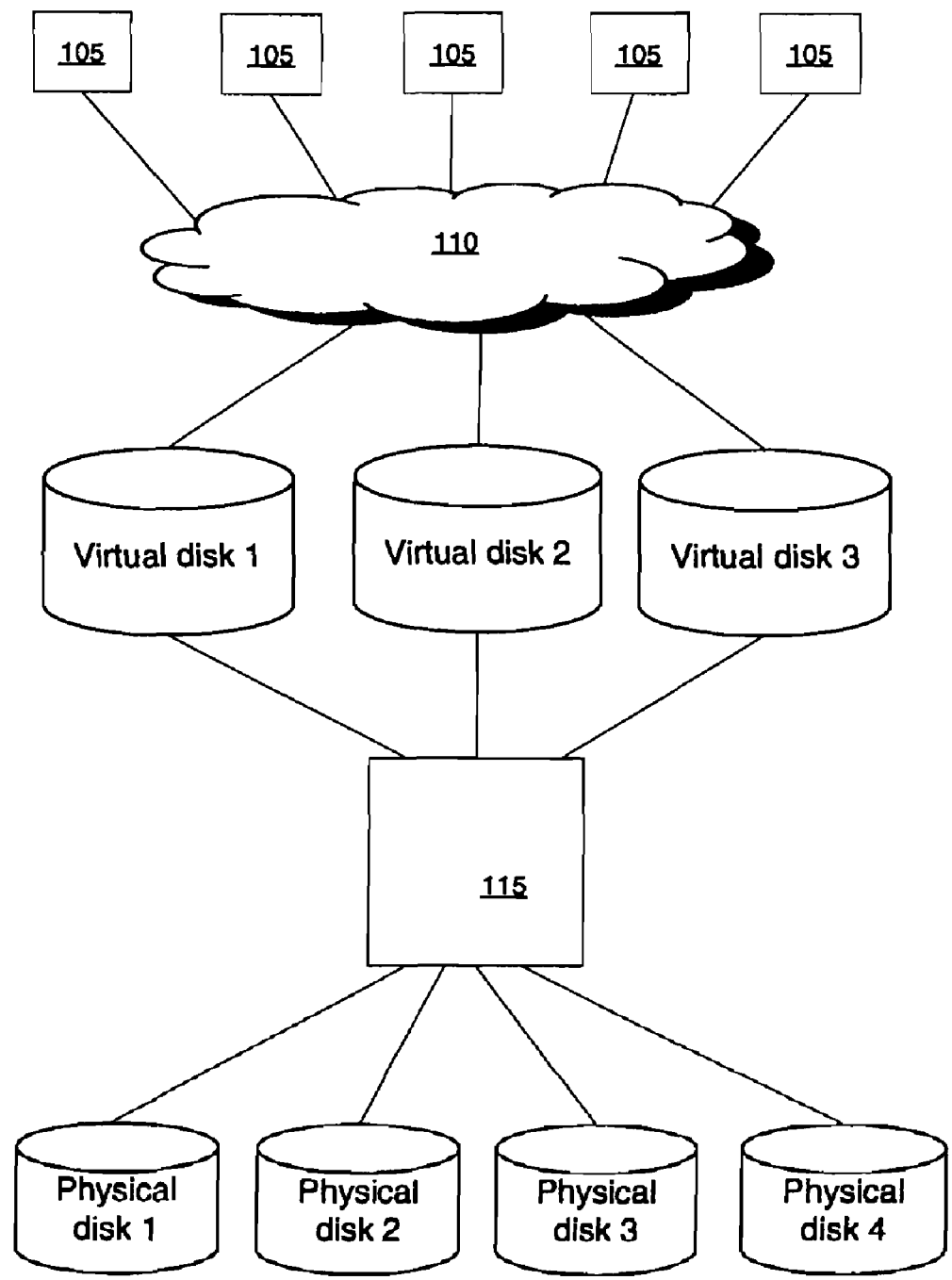
FIG. 1A is a block diagram of a computer system comprising a SAN in which aspects of the illustrative embodiments may be implemented.

Referring to FIG. 1A, a computer system (100) is shown wherein one or more client computers (105) access one or more virtual disks (i.e. Virtual Disk 1, Virtual Disk 2 and Virtual Disk 3) via a computer network (110) in which aspects of the illustrative embodiments may be implemented. The computer network (110) can be in the form of a Local Area Network (LAN), a Wide Area Network (WAN) and can be, for example, via the Internet.

The one or more virtual disks are mapped to one or more physical disks (i.e. Physical Disk 1, Physical Disk 2, Physical Disk 3 and Physical Disk 4) using a SVC (115). The one or more physical disks can include various different forms such as shared storage arrays, tape libraries, disk storage (all referred to generally as storage devices).

Figure 1B:
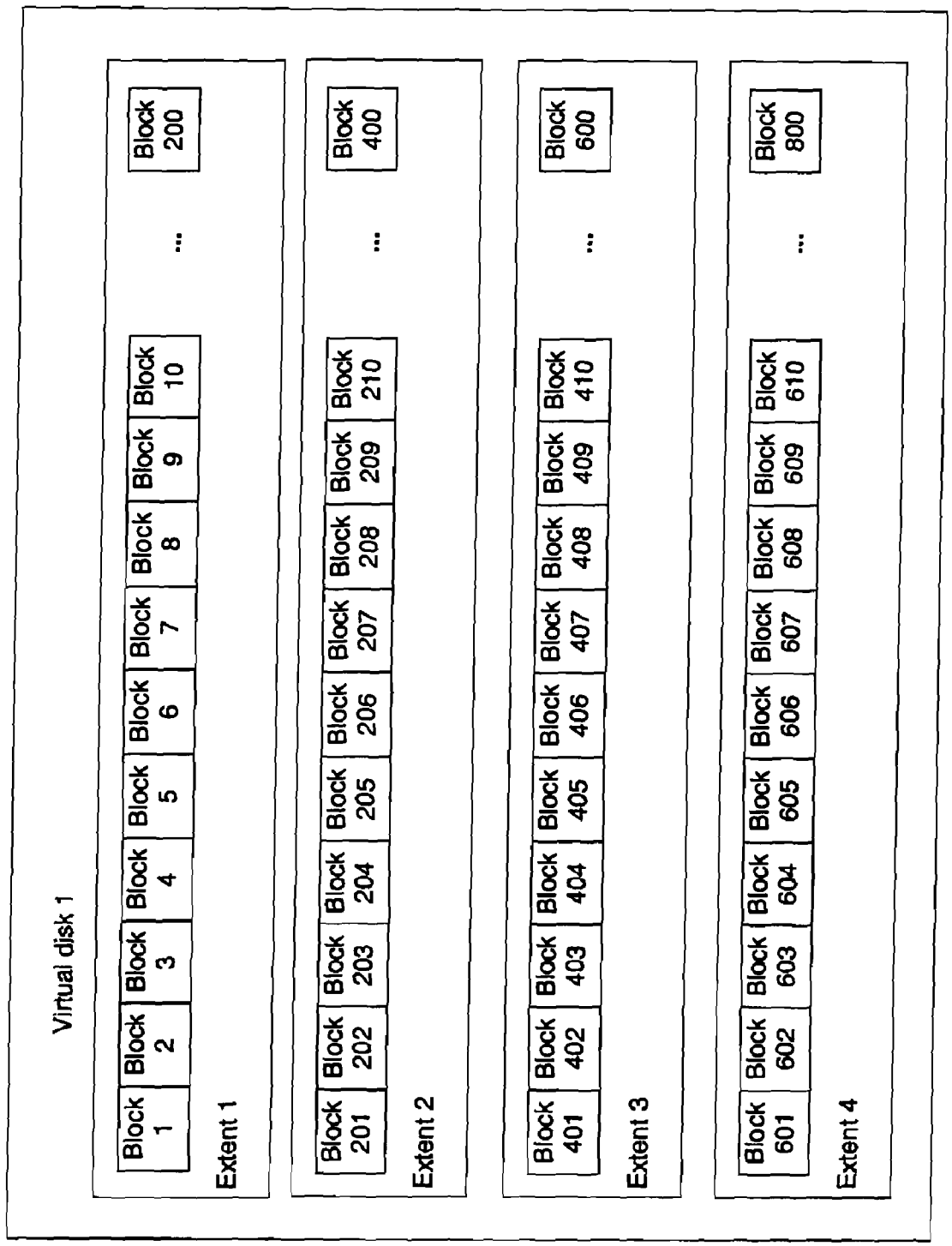
FIG. 1B is a representation of a virtual disk in which aspects of the illustrative embodiments may be implemented.
Figure 1C:
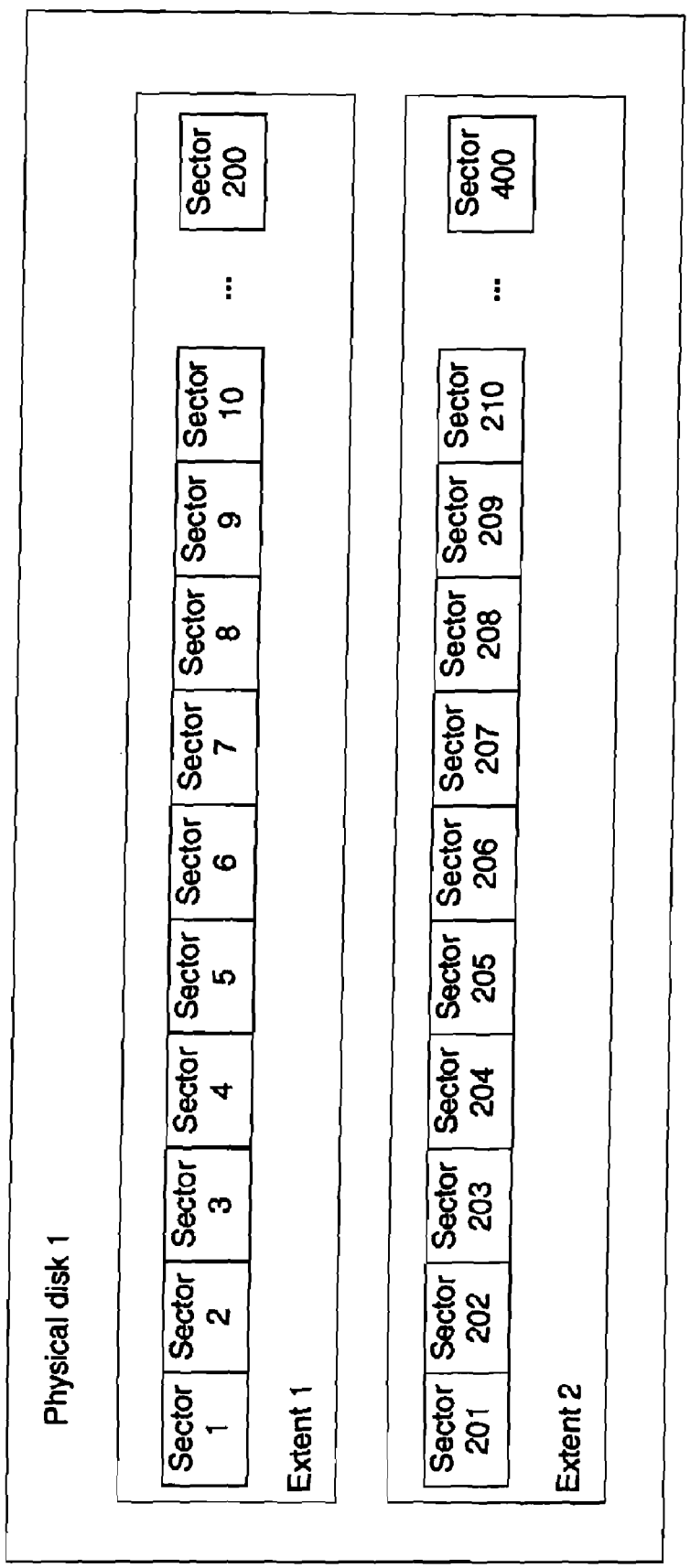
FIG. 1C is a representation of a physical disk in which aspects of the illustrative embodiments may be implemented.

A representation of a virtual disk, namely Virtual Disk 1 is shown in FIG. 1B in which aspects of the illustrative embodiments may be implemented. A representation of a physical disk, namely Physical Disk 1 is shown in FIG. 1C in which aspects of the illustrative embodiments may be implemented.

In the exemplary description herein, each virtual disk comprises 800 logical blocks of data. Each physical disk comprises 400 sectors and provides two extents, each of which comprises 200 sectors. 200 logical blocks on a virtual disk are mapped to one 200 sector extent on a physical disk. It will be clear to one of ordinary skill in the art that the sizings are merely exemplary.

In the description herein, disk data associated with storage state of the virtual disks and physical disks is as follows.

A first 200 logical blocks of Virtual Disk 1 are mapped to a first extent comprising a first 200 sectors on Physical Disk 1. A second 200 logical blocks of Virtual Disk 1 are mapped to a second extent comprising a second 200 sectors on Physical Disk 1. A third 200 logical blocks of Virtual Disk 1 are mapped to a third extent comprising a first 200 sectors on Physical Disk 2. A fourth 200 logical blocks of Virtual Disk 1 are mapped to a fourth extent comprising a second 200 sectors on Physical Disk 2.

A first 200 logical blocks of Virtual Disk 2 are mapped to a fifth extent comprising a first 200 sectors on Physical Disk 3. A second 200 logical blocks of Virtual Disk 2 are mapped to a sixth extent comprising a second 200 sectors on Physical Disk 3. A third 200 logical blocks of Virtual Disk 2 are mapped to a seventh extent comprising a first 200 sectors on Physical Disk 4. A fourth 200 logical blocks of Virtual Disk 2 are mapped to an eighth extent comprising a second 200 sectors on Physical Disk 4.

It should be understood that when a storage device is virtualised but under-utilised, large numbers of arrays may not be allocated as extents or extents that are allocated may not be used regularly. Similarly, even if a storage pool is fully allocated, certain parts of it may not be required from an application point of view at any particular time.

Figure 2:
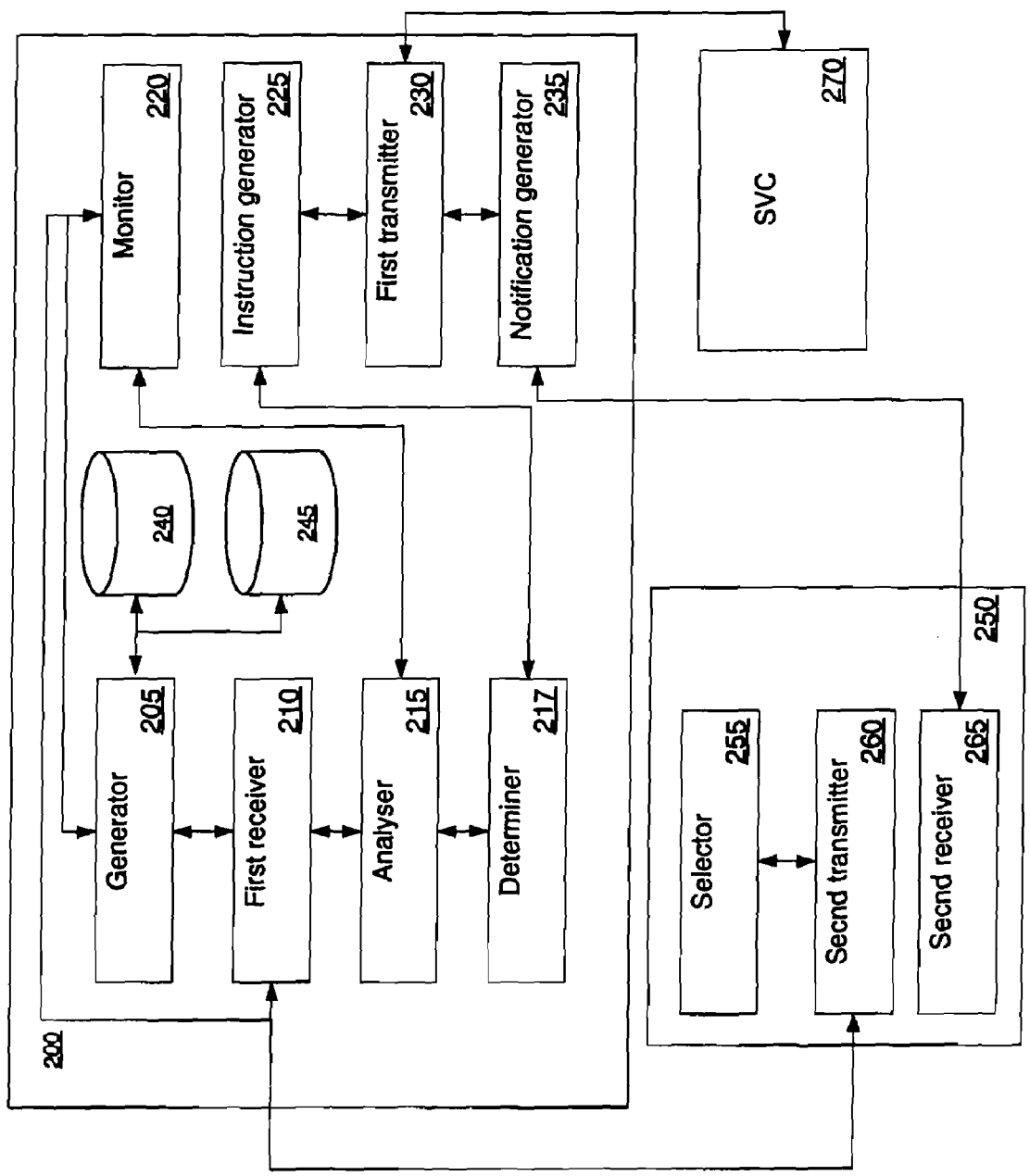
FIG. 2 is a schematic diagram of an apparatus for power management in accordance with an illustrative embodiment, for use with the computer system of FIG. 1.
Figure 3:
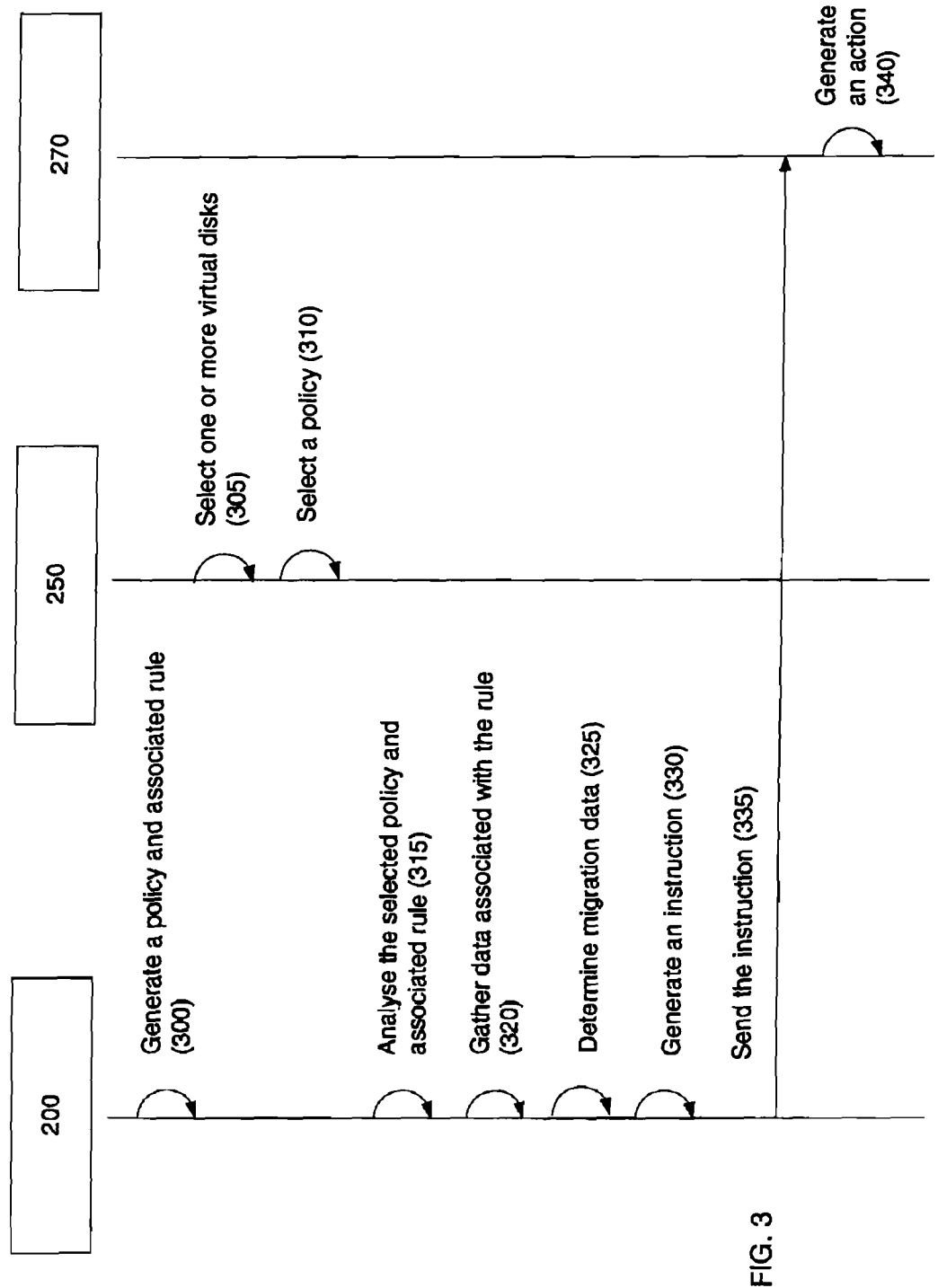
FIG. 3 is a flow chart showing the operational steps involved in a power-management process in accordance with an illustrative embodiment.

With reference to FIG. 2 and FIG. 3, a first illustrative embodiment will now be described. FIG. 2 is a schematic diagram of an apparatus for power management in accordance with an illustrative embodiment, for use with the computer system of FIG. 1. FIG. 3 is a flow chart showing the operational steps involved in a power-management process in accordance with an illustrative embodiment.

The apparatus (200) comprises a generator (205) for generating (step 300) a power-management policy. Preferably, the generator (205) comprises storing means for storing a generated power-management policy in a policy base (240). The generator (205) also generates (step 300) a rule associated with a power-management policy and stores the generated rule in a rule base (245).

A user is operable to interact with a client computer (250) comprising a selector (255). The selector (255) is operable to select (step 305) a set of the one or more virtual disks and to select (step 310) inputs associated with a power-management policy. The selector (255) is operable to access the policy base (240).

The client computer (250) also comprises a second transmitter (260) for transmitting a selected power-management policy to a first receiver (210) residing on the apparatus (200). The first receiver (210) is operable to communicate with an analyser (215) and in response to receiving the selected power-management policy, the first receiver (210) passes the selected power-management policy to the analyser (215). The client computer (250) also comprises a second receiver (265) for receiving a notification generated by a notification generator (235).

The analyser (215) is operable to analyse (step 315) the received selected power-management policy and associated one or more rules. In response to the analysis, the analyser (215) is operable to invoke a monitor (220).

The monitor (220) is operable to gather (step 320) data associated with the one or more rules. The monitor (220) is operable to pass the gathered data to the analyser (215). The analyser (215) is operable to analyse the gathered data and the selected power-management policy and associated one or more rules.

A determiner (217) is operable to determine (step 325), in response to the analysis, migration data. Preferably, the determiner (217) is operable to store the migration data.

The determiner (217) is operable to pass the migration data to a instruction generator (225). The instruction generator (225) is operable to use the migration data to generate (step 330) an instruction. Preferably, the instruction generator (225) is operable to store the instruction.

The instruction generator (225) is operable to pass the instruction to a first transmitter (230) residing on the apparatus (200).

The first transmitter (230) sends (step 335) a generated instruction to a SVC (270). In response to receiving a generated instruction the SVC (270) can execute (step 340) an action. Preferably, the action implements the selected power-management policy.

In a first example, the generator (205) generates (step 300) a plurality of power-management policies and stores the power-management policies in the policy base (240). Preferably, a power-management policy represents a balance between a power-management parameter and any number of other parameters (e.g. a security parameter, a reliability parameter etc.). In the first example, the power-management policies comprise a power-management parameter and a performance parameter.

An example of a power-management policy is shown below, wherein "(x)" indicates a value associated with the power-management parameter and "(y)" indicates a value associated with the performance parameter. In the first example, a sum of the values is 100. For a parameter, a value of 100 denotes maximum weight and a value of 0 denotes minimum weight.

Power-Management Policy:

Power management (x); Performance (y)

It should be understood that a power-management policy can be represented in any number of other ways.

At step 300, the generator (205) generates at least one rule associated with each power-management policy and stores the generated at least one rule in the rule base (245). An example of a rule is shown below, wherein n1' (i.e. a second number) is associated with n1 (i.e. a first number) and n1 is associated with values of parameters of a particular power-management policy:

Rule:
Select n1 physical disks to which selected logical blocks can be migrated; select n1' logical blocks to be migrated It should be understood that a rule can be represented in any number of other ways.

At step 305, the user interacts with a selector (255) to select a set of the one or more virtual disks (e.g. wherein the selector (255) is provided in the form of a menu). In the first example, the selector (255) selects Virtual Disk 1 and Virtual Disk 2.

Furthermore, the selector (255) selects (step 310) inputs associated with a power-management policy. Preferably, the selector (255) is provided to the user in the form of a "slider" bar residing between an icon (or any other object) representing the power-management parameter and an icon representing the performance parameter, such that the user can move the slider bar between positions located between the icons. For example, movement of the slider bar to a middle position between the icons represents a power-management parameter value of "50" and a performance parameter value of "50". It will be clear to one of ordinary skill in the art that the implementation of the selector is merely exemplary.

In the first example, the selector (255) selects the following inputs:

Policy 1: Power management (75); Performance (25)

The second transmitter (260) transmits virtual disk identifiers associated with the selected virtual disks (i.e. Virtual Disk 1 and Virtual Disk 2) and transmits Policy 1 (or a policy identifier associated with Policy 1) to the first receiver (210). In response to receiving the virtual disk identifiers and Policy 1, the first receiver (210) passes the virtual disk identifiers and Policy 1 to the analyser (215). If the first receiver (210) receives a policy identifier associated with Policy 1, the first receiver (210) uses the policy identifier to obtain Policy 1 from the policy base (240) and then passes Policy 1 to the analyser (215).

The analyser (215) analyses (step 315) the virtual disk identifiers by parsing the identifiers. The analyser (215) analyses (step 315) Policy 1 by parsing Policy 1 to obtain a policy identifier associated with Policy 1 (e.g. wherein the identifier is "Policy 1"). In response to obtaining the identifier associated with Policy 1, the analyser (215) accesses the rule base (245) and uses the identifier in order to obtain at least one rule associated with Policy 1.

In the first example, the analyser (215) obtains Rule 1 shown below. In Rule 1, n1' is associated with n1 such that n1' (i.e. 400) logical blocks can reside on n (i.e. 1) physical disk. Furthermore, n1 is associated with the power-management and performance parameters.

Rule 1: Select 1 physical disk to which selected logical blocks can be migrated; select 400 logical blocks to be migrated In response to the analysis, the analyser (215) is operable to invoke the monitor (220). The analyser (215) passes the virtual disk identifiers to the monitor (220). The monitor (220) is operable to use the virtual disk identifiers to gather (step 320) data associated with Rule 1. In the first example, the monitor (220) gathers usage data (in operations per second) associated with the selected set of the one or more virtual disks (i.e. Virtual Disk 1 and Virtual Disk 2) in order to determine frequently accessed logical blocks. Alternatively, an external component can determine frequently accessed logical blocks.

In the first example, the monitor (220) gathers data associated with frequently accessed logical blocks:

first 200 logical blocks of Virtual Disk 1 that is mapped to a first extent comprising a first 200 sectors on Physical Disk 1;

a third 200 logical blocks of Virtual Disk 1 that is mapped to a third extent comprising a first 200 sectors on Physical Disk 2;

a second 200 logical blocks of Virtual Disk 2 that is mapped to a sixth extent comprising a second 200 sectors on Physical Disk 3; and a third 200 logical blocks of Virtual Disk 2 that is mapped to a seventh extent comprising a first 200 sectors on Physical Disk 4.

Thus, the frequently accessed logical blocks comprise 800 logical blocks.

It should be understood that the 800 frequently accessed logical blocks could be migrated amongst two of the physical disks (e.g. Physical Disk 1 and Physical Disk 2) (wherein each physical disk comprises 400 sectors), if the remaining 800 logical blocks on the two physical disks (i.e. logical blocks that are not frequently accessed) are migrated elsewhere (e.g. to the other two of the physical disks: Physical Disk 3 and Physical Disk 4).

However, as Rule 1 provides that the selected logical blocks should reside on one physical disk, the monitor (220) determines further data comprising a subset of the 800 frequently accessed logical blocks, wherein the subset can reside on one physical disk. In the first example, the monitor (220) determines a subset comprising 400 of the most frequently accessed logical blocks (the remaining 400 logical blocks of the 800 frequently accessed logical blocks are termed herein as "less frequently accessed logical blocks"):

A first 200 logical blocks of Virtual Disk 1 that are mapped to a first extent comprising a first 200 sectors on Physical Disk 1; and a third 200 logical blocks of Virtual Disk 2 that are mapped to a seventh extent comprising a first 200 sectors on Physical Disk 4.

The monitor (220) passes the data associated with the most frequently accessed logical blocks to the analyser (215).

Furthermore, in accordance with Rule 1, the analyser (215) selects one physical disk to which migration occurs. In the first example, the selection is made randomly. In another example, the selection is made in accordance with user input (e.g. input associated with storage categorisation etc.).

In the first example, the analyser (215) selects Physical Disk 4.

In response, the monitor (220) gathers physical disk data (i.e. data associated with Rule 1—data associated with storage state) associated with the selected Physical Disk 4. Physical Disk 4 comprises a third 200 logical blocks of Virtual Disk 2 that is mapped to a seventh extent comprising a first 200 sectors on Physical Disk 4—these logical blocks have been identified in the first subset. Physical Disk 4 also comprises a fourth 200 logical blocks of Virtual Disk 2 are mapped to an eighth extent comprising a second 200 sectors on Physical Disk 4.

The monitor (220) sends the physical disk data associated with the selected Physical Disk 4 to the analyser (215). The analyser (215) analyses the further data associated with the first subset and the physical disk data associated with the selected Physical Disk 4. For example, the analyser compares a size of the first subset with a size available on a selected physical disk etc.

In the first example, the analyser compares a size of the first subset (i.e. 400 logical blocks comprising 200 sectors on Physical Disk 1 and 200 sectors on Physical Disk 4) to a size available on a Physical Disk 4 (i.e. 0 sectors due to Physical Disk 4 having a seventh extent comprising a first 200 sectors and an eighth extent comprising a second 200 sectors). The analyser analyses a size available on temporary storage (i.e. in the first example, 600 sectors).

In response to the analysis, the determiner (217) determines (step 325) migration data.

In the first example, the migration data is shown below:

Migrate the fourth 200 logical blocks of Virtual Disk 2 (mapped to the second 200 sectors on Physical Disk 4) to temporary storage.

Migrate the first 200 logical blocks of Virtual Disk 1 to the second 200 sectors on Physical Disk 4.

Migrate the fourth 200 logical blocks of Virtual Disk 2 from the temporary storage to the first 200 sectors on Physical Disk 1.

Preferably, in accordance with a pre-configurable setting, the determiner (217) determines that logical blocks identified in the first subset that are already mapped to sectors on the selected physical disk, do not have to be migrated. Thus, in the first example, the determiner (217) determines that since the third 200 logical blocks of Virtual Disk 2 (i.e. wherein these logical blocks are identified in the first subset comprising most frequently accessed logical blocks) are already mapped to the first 200 sectors on the selected disk i.e. Physical Disk 4, migration associated with the third 200 logical blocks of Virtual Disk 2 is not required.

In response to determining the migration data, the determiner (217) passes the migration data to the instruction generator (225). The instruction generator (225) uses the migration data in order to generate (step 330) one or more instructions that are understandable by the SVC (270). In the first example, the instruction generator (225) formats the migration data to generate three instructions:

<Instruction_1> migrate "fourth 200 logical blocks of Virtual Disk 2" to "temporary storage"</Instruction_1>

<Instruction_2> migrate "first 200 logical blocks of Virtual Disk 1" to "second 200 sectors on Physical Disk 4"</Instruction_2>

<Instruction_3> migrate "fourth 200 logical blocks of Virtual Disk 2" from "temporary storage" to "first 200 sectors on Physical Disk 1"</Instruction_3>

The first transmitter (230) sends (step 335) the instructions to the SVC (270). Preferably, the notification generator (235) generates a notification indicating that instructions have been sent to the SVC (270). The first transmitter (230) sends the notification to the second receiver (265) residing on the client computer (250).

It should be understood that in response to receiving the instructions, the SVC (270) may execute (step 340) one or more actions. For example, the SVC (270) may migrate data to the selected physical disks in accordance with the instructions. Furthermore, the remaining physical disks (i.e. Physical Disk 1, Physical Disk 2 and Physical Disk 3) may be powered down (e.g. using an active command from a component, or using power-management functionality associated with the physical disks (e.g. wherein the power-management functionality resides in a physical disk or resides in an external component)). Advantageously, this allows for a balance to be achieved between power management and performance.

Thus, it should be understood that the apparatus of the present invention provides instructions that can create an environment to allow for power-management functionality to be implemented.

Preferably, the determiner (217) also determines migration data associated with an optimised migration of the remaining less frequently or non-frequently accessed logical blocks (e.g. such that migration would allow for ease of access to the remaining logical blocks). For example, in the first example, the determiner (217) determines migration data such that the remaining 400 less frequently accessed logical blocks can be migrated to the same physical disk; the remaining 800 non-frequently accessed logical blocks can be migrated to two physical disks.

Although in the illustrative embodiment, the physical disk selected by the analyser (215) is a physical disk on which some of the selected logical blocks are already mapped, it should be understood that the physical disk selected by the analyser (215) can be any other form of storage and need not be storage on which some of the selected logical blocks are already mapped.

Figure 4:
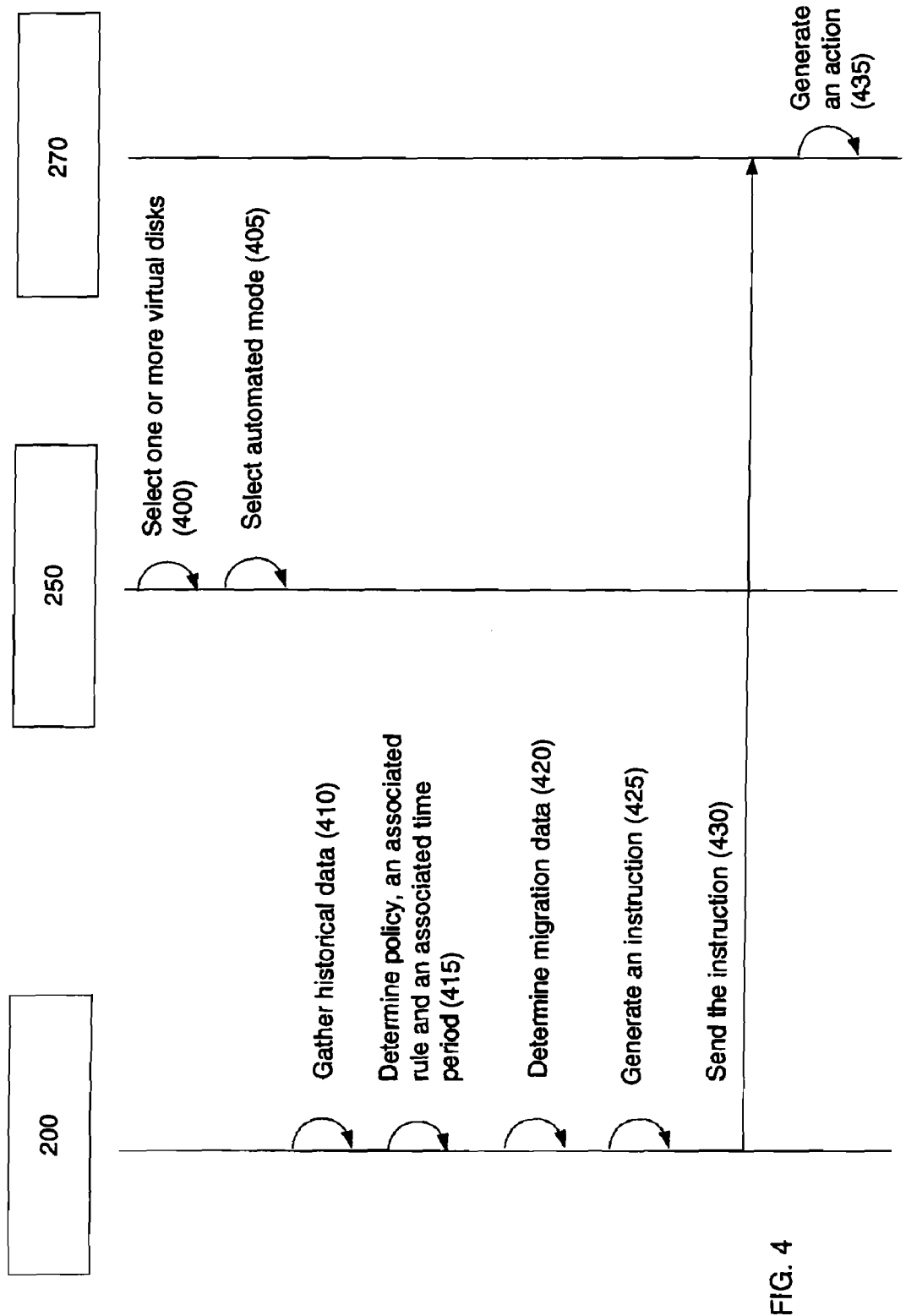
FIG. 4 is a flow chart showing the operational steps involved in a power-management process in accordance with an illustrative embodiment.
Figure 5:
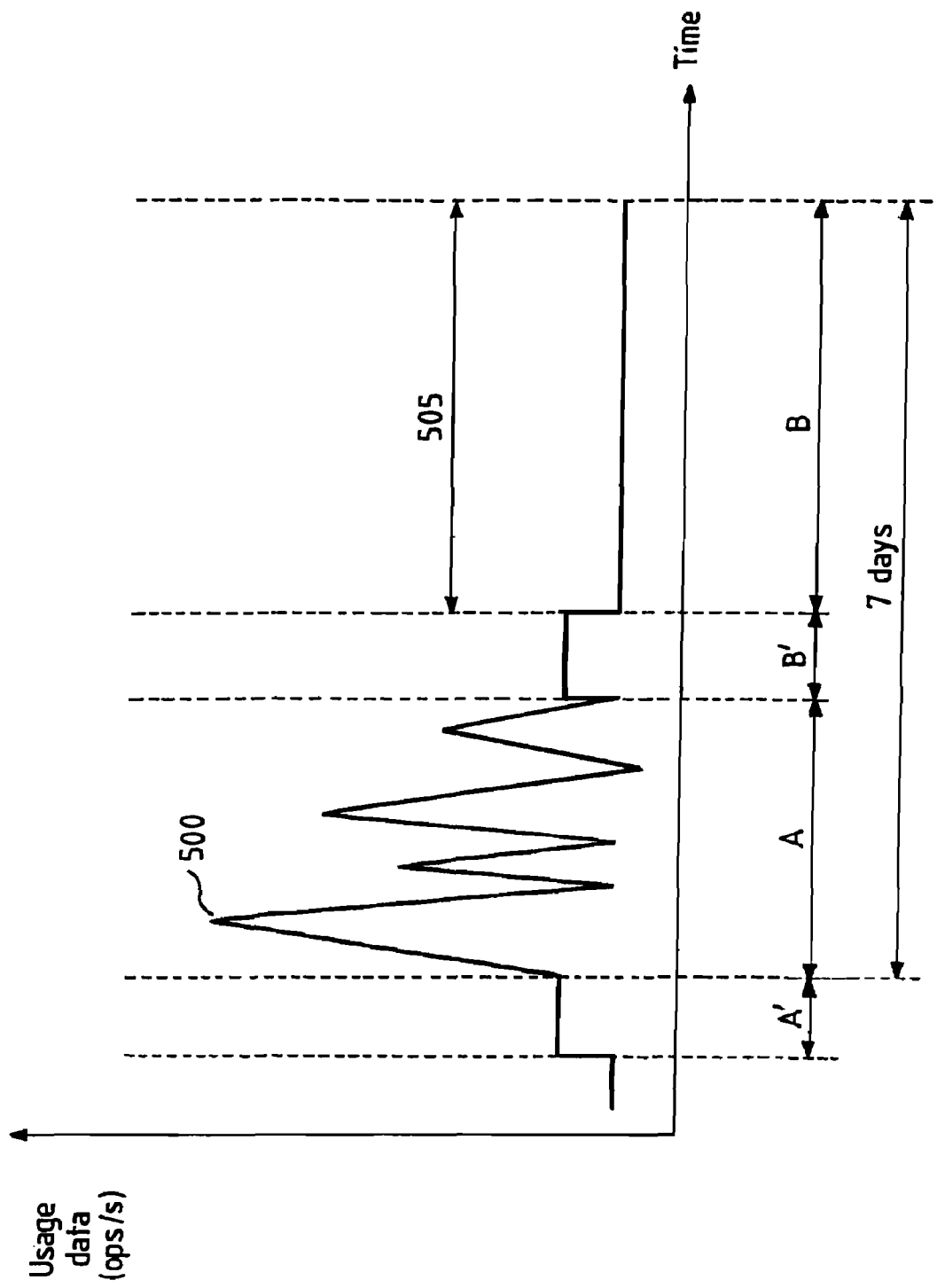
FIG. 5 is a graphical representation of historical data in accordance with an illustrative embodiment.

With reference to FIG. 2, FIG. 4 and FIG. 5, a second illustrative embodiment will now be described. FIG. 2 is a schematic diagram of an apparatus for power management in accordance with an illustrative embodiment, for use with the computer system of FIG. 1. FIG. 4 is a flow chart showing the operational steps involved in a power-management process in accordance with an illustrative embodiment. FIG. 5 is a graphical representation of historical data in accordance with an illustrative embodiment.

In a second example, the physical disk data is as described in the description with reference to FIG. 1A and FIG. 1B.

At step 400, the user interacts with a selector (255) to select a set of the one or more virtual disks (e.g. wherein the selector (255) is provided in the form of a menu). In the second example, the selector (255) selects Virtual Disk 1 and Virtual Disk 2. Furthermore, the selector (255) selects (step 405) an icon representing an "automatic mode".

The second transmitter (260) transmits virtual disk identifiers associated with the selected virtual disks and an identifier representing an "automatic mode" to the first receiver (210). The first receiver (210) passes the virtual disk identifiers and the identifier representing an "automatic mode" to the monitor (220).

In response to receiving the identifier representing an "automatic mode", the monitor (220) is operable to use the virtual disk identifiers to gather (step 410) historical data. In the second example, the monitor (220) gathers usage data (in operations per second) associated with the selected virtual disks (i.e. Virtual Disk 1 and Virtual Disk 2) wherein the usage data has an associated time period (e.g. usage data associated with the last month).

In an alternative embodiment, an external component can determine the usage data.

In a further alternative embodiment, a user can provide the usage data.

A graphical representation of the usage data against a time period of one week is shown in FIG. 5.

The monitor (220) gathers data associated with a pattern of usage and a time period associated with the pattern. In the second example, a pattern of usage and an associated time period marked "A" is shown in FIG. 5.

In the second example, a value "A" represents Monday 9 am to Monday 6 pm. However, it should be understood that a value of a time period can be represented in a number of ways (e.g. wherein a value comprises a date). It should be understood that a time period associated with a policy need not be a regularly occurring time period.

The monitor (220) passes the value of "A" to the generator (205).

The monitor (220) also determines a percentage value of a total usage capacity at a peak usage. In the second example, the monitor (220) determines that a percentage value at a peak usage (shown at 500 in FIG. 5) represents 75% of a total usage capacity.

Alternatively, the percentage value may be a percentage value of a user defined threshold.

The monitor (220) passes the percentage value to the generator (205).

The generator (205) uses the value of "A" and the percentage value (i.e. historical data) to generate (step 415) a power-management policy. Preferably, the generator (205) stores the power-management policy in the policy base (240).

In the second example, the power-management policy comprises a power-management parameter, a performance parameter and an associated time period.

The generator (205) associates the value of the performance parameter with the percentage value (i.e. historical data).

An example of a power-management policy is shown below, wherein "(x)" indicates a value associated with the power-management parameter; "(y)" indicates a value associated with the performance parameter and "(z)" indicates a value associated with the time period. In the second example, a sum of the values of (x) and (y) is 100. For a parameter, a value of 100 denotes maximum weight and a value of 0 denotes minimum weight.

Power-Management Policy:
Power management (x); Performance (y)
Time period=(z)

In the second example, a power-management policy and associated inputs are shown below:

Policy 2:
Power management (25); Performance (75)
Time period=Monday 9 am to Monday 6 pm The generator (205) also generates at least one rule associated with the power-management policy and stores the generated at least one rule in the rule base (245). An example of a rule is shown below, wherein n1' (i.e. a second number) is associated with n1 (i.e. a first number) and n1 is associated with values of parameters of a particular power-management policy:

Rule:
Select n1 physical disks to which selected logical blocks can be migrated; select n1' logical blocks to be migrated In the second example, the generator (205) generates Rule 2 shown below, wherein n1' is associated with n1 such that n1' (i.e. 1150) logical blocks can reside on n (i.e. 3) physical disks. Furthermore, n1 is associated with the power-management and performance parameters.

Rule 2: Select 3 physical disks to which selected logical blocks can be migrated; select up to 1200 logical blocks to be migrated Furthermore, the monitor (220) is operable to use the virtual disk identifiers to gather (step 410) data associated with Rule 2. In the second example, the monitor (220) gathers usage data (in operations per second) associated with the selected set of the one or more virtual disks (i.e. Virtual Disk 1 and Virtual Disk 2) in order to determine frequently accessed logical blocks.

A first 200 logical blocks of Virtual Disk 1 that is mapped to a first extent comprising a first 200 sectors on Physical Disk 1;

A fourth 200 logical blocks of Virtual Disk 1 that is mapped to a fourth extent comprising a second 200 sectors on Physical Disk 2;

100 logical blocks of Virtual Disk 2 that are mapped to a first half of a fifth extent comprising 100 sectors on Physical Disk 3;

100 logical blocks of Virtual Disk 2 that are mapped to a second half of an eighth extent comprising 100 sectors on Physical Disk 4.

Thus, the frequently accessed logical blocks comprise 600 logical blocks.

It should be understood that the 600 frequently accessed logical blocks could be migrated amongst two of the physical disks (e.g. Physical Disk 1 and Physical Disk 2). However, Rule 2 provides that the selected logical blocks should reside on three physical disks.

The monitor (220) passes the data associated with the frequently accessed logical blocks to the analyser (215).

In accordance with Rule 2, the analyser (215) selects three physical disks to which migration occurs. In the second example, the selection is made randomly and the analyser (215) selects Physical Disk 1, 2 and 4.

In response, the monitor (220) gathers physical disk data (i.e. data associated with Rule 2—data associated with storage state) associated with the selected physical disks.

It should be noted that Physical Disk 1 comprises 200 frequently accessed logical blocks and 200 non-frequently accessed logical blocks; Physical Disk 2 comprises 200 frequently accessed logical blocks and 200 non-frequently accessed logical blocks; and Physical Disk 4 comprises 100 frequently accessed logical blocks and 300 non-frequently accessed logical blocks.

The monitor (220) sends the physical disk data associated with the selected physical disks to the analyser (215). The analyser (215) analyses the data associated with the frequently accessed logical blocks and the physical disk data. The analyser (215) also analyses data associated with temporary storage.

In response to the analysis, the determiner (217) determines (step 420) migration data. In the second example, the migration data is shown below:

Migrate 100 logical blocks of Virtual Disk 2 that are mapped to a first half of an eighth extent comprising 100 sectors on Physical Disk 4 to temporary storage.

Migrate 100 logical blocks of Virtual Disk 2 that are mapped to a first half of a fifth extent comprising 100 sectors on Physical Disk 3 to a first half of an eighth extent comprising 100 sectors on Physical Disk 4.

Migrate the 100 logical blocks of Virtual Disk 2 from the temporary storage to the first half of the fifth extent comprising 100 sectors on Physical Disk 3.

In response to determining the migration data, the determiner (217) passes the migration data to the instruction generator (225). The instruction generator (225) uses the migration data in order to generate (step 425) one or more instructions that are understandable by the SVC (270). In the second example, the instruction generator (225) formats the migration data to generate three instructions:

<Instruction_4> migrate "100 logical blocks in first half of an eighth extent comprising 100 sectors on Physical Disk 4" to "temporary storage"</Instruction_4>

<Instruction_5> migrate "100 logical blocks in first half of a fifth extent comprising 100 sectors on Physical Disk 3" to "a first half of an eighth extent comprising 100 sectors on Physical Disk 4"</Instruction_5>

<Instruction_6> migrate "100 logical blocks from temporary storage" to "first half of the fifth extent comprising 100 sectors on Physical Disk 3"</Instruction_6>

The first transmitter (230) sends (step 430) the instructions to the SVC (270). Preferably, the notification generator (235)

generates a notification indicating that instructions have been sent to the SVC (270). The first transmitter (230) sends the notification to the second receiver (265) residing on the client computer (250).

It should be understood that in response to receiving the instructions, the SVC (270) may execute (step 435) one or more actions. For example, when time period "A" begins, the SVC (270) may power up Physical Disks 1, 2, 3 and 4; migrate data to the selected physical disks in accordance with the instructions and furthermore, the remaining physical disk (i.e. Physical Disk 3) may be powered down. Advantageously, this allows for a balance to be achieved between power management and performance.

Preferably, the determiner (217) analyses a number of parameters e.g. size of data to be migrated, in order to determine a migration period (shown as A' in FIG. 5). The migration period represents a time period during which migration of data to selected physical disks should occur so as to enable provision of an environment that is optimised to handle usage at a start of time period A.

Preferably, in response to determination of the migration period, the determiner (217) passes data associated with the migration period to the instruction generator (225). The instruction generator (225) uses the data associated with the migration period in order to generate one or more instructions that are understandable by the SVC (270). The first transmitter (230) sends the instructions to the SVC (270). In response to receiving the instructions, the SVC (270) can determine when to begin data migration.

Advantageously, determination of a migration period, provides for an environment wherein pre-emptive action can be take by the SVC (270).

Thus, it should be understood that the apparatus of the present invention provides instructions that can create an environment to allow for power-management functionality to be implemented.

In the second example, the monitor (220) also gathers further data associated with a pattern of usage and a time period associated with the pattern. In the second example, a pattern of usage and an associated time period marked "B" (i.e. wherein a value "B" represents Monday 6 pm to Monday 9 am) is shown in FIG. 5. The monitor (220) passes the value of "B" to the generator (205).

The monitor (220) also determines a percentage value of a total usage capacity at a peak usage. In the second example, the monitor (220) determines that a percentage value at a peak usage (shown at 505 in FIG. 5) represents 25% of a total usage capacity. The monitor (220) passes the percentage value to the generator (205).

The generator (205) uses the value of "B" and the percentage value (i.e. historical data) to generate (step 415) a power-management policy. Preferably, the generator (205) stores the power-management policy in the policy base (240).

In the second example, the power-management policy comprises a power-management parameter, a performance parameter and an associated time period.

The generator (205) associates the value of the performance parameter with the percentage value (i.e. historical data). In the second example, the power-management policy and associated inputs are shown below:
Policy 3:
Power management (75); Performance (25)
Time period=Monday 6 pm to Monday 9 am
The generator (205) also generates at least one rule associated with the power-management policy and stores the generated at least one rule in the rule base (245). In the second example, the generator (205) generates Rule 3, wherein n1' is associated with n1 such that n1' (i.e. 400) logical blocks can reside on n (i.e. 1) physical disk. Furthermore, n1 is associated with the power-management and performance parameters.

Rule 3: Select 1 physical disk to which selected logical blocks can be migrated; select 400 logical blocks to be migrated Furthermore, the monitor (220) is operable to use the virtual disk identifiers to gather (step 410) data associated with Rule 2. In the second example, the monitor (220) gathers usage data (in operations per second) associated with the selected set of the one or more virtual disks (i.e. Virtual Disk 1 and Virtual Disk 2) in order to determine frequently accessed logical blocks.

A first 200 logical blocks of Virtual Disk 1 that is mapped to a first extent comprising a first 200 sectors on Physical Disk 1;
A fourth 200 logical blocks of Virtual Disk 1 that is mapped to a fourth extent comprising a 100 sectors on Physical Disk 2;
100 logical blocks of Virtual Disk 2 that are mapped to a second half of an eighth extent comprising 100 sectors on Physical Disk 4.

Thus, the frequently accessed logical blocks comprise 500 logical blocks.

It should be understood that the 500 frequently accessed logical blocks could be migrated amongst two of the physical disks (e.g. Physical Disk 1 and Physical Disk 2). However, since Rule 3 provides that the selected logical blocks should reside on one physical disk, the monitor (220) determines further data comprising a subset of the 500 frequently accessed logical blocks, wherein the subset can reside on one physical disk. In the second example, the monitor (220) determines a second subset comprising 400 of the most frequently accessed logical blocks:

A first 200 logical blocks of Virtual Disk 1 that are mapped to a first extent comprising a first 200 sectors on Physical Disk 1;
100 logical blocks of Virtual Disk 1 that are mapped to a first half of a fourth extent comprising a second 200 sectors on Physical Disk 2;
100 logical blocks of Virtual Disk 2 that are mapped to a second half of an eighth extent comprising 100 sectors on Physical Disk 4.

The monitor (220) passes the data associated with the most frequently accessed logical blocks to the analyser (215).

In accordance with Rule 3, the analyser (215) selects one physical disk to which migration occurs. In the second example, the selection is made randomly and the analyser (215) selects Physical Disk 1.

In response, the monitor (220) gathers physical disk data associated with the selected physical disk (i.e. data associated with Rule 2—data associated with storage state).

It should be noted that Physical Disk 1 comprises a first 200 logical blocks of Virtual Disk 1 that are mapped to a first extent comprising a first 200 sectors on Physical Disk 1—these logical blocks have been identified in the second subset and a second 200 logical blocks of Virtual Disk 1 that are mapped to a second extent comprising a second 200 sectors on Physical Disk 1.

The monitor (220) sends the physical disk data associated with the selected Physical Disk 1 to the analyser (215). The analyser (215) analyses the further data associated with the second subset and the physical disk data. The analyser (215) also analyses data associated with a further physical disk (i.e. Physical Disk 5 (not shown).

In response to the analysis, the determiner (217) determines (step 420) migration data. In the second example, the migration data is shown below:

Migrate second 200 logical blocks of Virtual Disk 1 that are mapped to a second extent comprising a second 200 sectors on Physical Disk 1 to Physical Disk 5

Migrate 100 logical blocks of Virtual Disk 1 that are mapped to a first half of a fourth extent comprising 100 sectors on Physical Disk 2 to 100 sectors of a first half of a second extent on Physical Disk 1;

Migrate 100 logical blocks of Virtual Disk 2 that are mapped to a second half of an eighth extent comprising 100 sectors on Physical Disk 4 to 100 sectors of a second half of a second extent on Physical Disk 1.

In response to determining the migration data, the determiner (217) passes the migration data to the instruction generator (225). The instruction generator (225) uses the migration data in order to generate (step 425) one or more instructions that are understandable by the SVC (270). In the second example, the instruction generator (225) formats the migration data to generate three instructions:

<Instruction_7> migrate "200 logical blocks in second extent comprising a second 200 sectors on Physical Disk 1" to "Physical Disk 5"</Instruction_7>

<Instruction_8> migrate "100 logical blocks of a first half of a fourth extent comprising 100 sectors on Physical Disk 2" to "100 sectors of a first half of a second extent on Physical Disk 1"</Instruction_8>

<Instruction_9> migrate "100 logical blocks of a second half of an eighth extent comprising 100 sectors on Physical Disk 4" to "100 sectors of a second half of a second extent on Physical Disk 1"</Instruction_9>

The first transmitter (230) sends (step 430) the instructions to the SVC (270). Preferably, the notification generator (235) generates a notification indicating that instructions have been sent to the SVC (270). The first transmitter (230) sends the notification to the second receiver (265) residing on the client computer (250).

It should be understood that in response to receiving the instructions, the SVC (270) may execute (step 435) one or more actions.

For example, if the SVC (270) executed actions associated with Policy 2 during time period "A", when time period "B" begins, the SVC (270) can execute actions associated with Policy 3.

For example, Physical Disk 5 is powered up; data is migrated to the selected physical disk in accordance with the instructions and furthermore, the remaining physical disks (i.e. Physical Disk 2, Physical Disk 4 and Physical Disk 5) may be powered down. Advantageously, this allows for a balance to be achieved between power management and performance.

Preferably, the determiner (217) analyses a number of parameters e.g. size of data to be migrated, in order to determine a migration period (shown as B' in FIG. 5). The migration period represents a time period during which migration of data to selected physical disks should occur so as to enable provision of an environment that is optimised to handle the decreased usage at a start of time period B.

Preferably, in response to determination of the migration period, the determiner (217) passes data associated with the migration period to the instruction generator (225). The instruction generator (225) uses the data associated with the migration period in order to generate one or more instructions that are understandable by the SVC (270). The first transmitter (230) sends the instructions to the SVC (270). In response to receiving the instructions, the SVC (270) can to determine when to begin data migration.

Advantageously, in the second embodiment, the generation of instructions to create an environment to allow for power-management functionality is implemented automatically with minimal user input.

Furthermore, by analysis of historical data, a prediction associated with a pattern of usage and an associated time period can be made. This prediction aids to generate a policy and associated instructions that can be used to implement power-management functionality. Thus, for example, during one time period (e.g. with an associated increased usage) a power-management policy biased towards a performance parameter can be implemented and during another time period (e.g. with an associated decreased usage) a power-management policy biased towards a power-management parameter can be implemented.

Preferably, differences between historical data (e.g. the pattern of usage, the associated time period etc.) and actual data are used in a feedback mechanism to update generated policies, such that accuracy of a policy improves.

Preferably, further user input can be utilised by the apparatus of the present invention e.g. a manually inserted control point specifying values selected by a user for a particular predicted pattern of usage, a particular percentage value of a total usage capacity at a peak usage etc. over a particular period. The control point is preferably used by the generator (205) to generate at least one of: a policy and input associated with a policy. Advantageously, a manually inserted control point can provide the apparatus with data to improve the accuracy of a generated policy.

It will be clear to one of ordinary skill in the art that all or part of the method of the illustrative embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the illustrative embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD- ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the illustrative embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

The invention claimed is:

1. An apparatus for managing power-consumption, for use in a storage system comprising first data stored on one or more storage devices, the apparatus comprising:
   receiving, by a selector, first user input identifying a selection of one or more virtual disks for which to migrate the first data;
   receiving, by the selector, second user input identifying a power management parameter and a first parameter, wherein the power management parameter and the first parameter are numerical values in a set of numerical values of 0 to 100 and wherein the sum of the power management parameter and the first parameter equal 100;
   generating, by a generator, a power-management policy using the power management parameter and the first parameter;
   generating, by the generator, a rule based on the power management policy generated using the power management parameter and the first parameter;
   responsive to receipt of the power-management policy, analysing, by an analyser, second data associated with the one or more virtual disks in accordance with the rule in order to identify the first data;
   identifying, by the analyser, at least one of the one or more storage devices to migrate the first data to in accordance with the first rule; and
   responsive to the analysis of the second data, determining, by a determiner, third data in accordance with the second data, wherein the third data is associated with migration of the first data to the at least one of the one or more storage devices.

2. The apparatus of claim 1, further comprising:
   gathering, by a monitor, the second data, wherein the second data comprises fourth data associated with usage of the first data and fifth data associated with a storage state of the one or more storage devices and wherein the second data comprises historical data.

3. The apparatus of claim 1, further comprising:
   responsive determining the third data, generating, by an instruction generator, a first instruction associated with the third data.

4. The apparatus of claim 3, further comprising:
   transmitting, by a transmitter, the first instruction to a storage controller in the storage system, wherein the storage controller is operable to use the first instruction to implement the policy, wherein the storage controller is operable to use the first instruction to at least one of: migrate the first data, retain the first data, power up the storage device, or power down a storage device in order to implement the policy, wherein the third data is associated with migration of the first data from a first storage device in the one or more storage devices to at least one second storage device in the one or more storage devices, and wherein the third data further comprises a migration time period associated with migration of the first data from the first storage device to the at least one second storage devices.

5. The apparatus of claim 3, further comprising:
   feeding back, by a feedback mechanism, fourth data associated with implementation of the policy to the instruction generator.

6. The apparatus of claim 1, wherein the policy comprises an associated time period parameter and wherein the first parameter comprises at least one of: a performance parameter, a security parameter, or a reliability parameter.

7. A computer implemented method for managing power-consumption, for use in a storage system comprising first data stored on one or more storage devices, the method comprising:
   receiving, by a selector executed by a processor, first user input identifying a selection of one or more virtual disks for which to migrate the first data;
   receiving, by the selector, second user input identifying a power management parameter and a first parameter, wherein the power management parameter and the first parameter are numerical values in a set of numerical values of 0 to 100 and wherein the sum of the power management parameter and the first parameter equal 100;
   generating, by a generator executed by the processor, a power-management policy using the power management parameter and the first parameter;
   generating, by the generator, a rule based on the power management policy generated using the power management parameter and the first parameter;
   analysing, by an analyser executed by the processor, in response to receiving the power-management policy, second data associated with the one or more virtual disks in accordance with the rule in order to identify the first data;
   identifying, by the analyser at least one of the one or more storage devices to migrate the first data to in accordance with the first rule; and
   determining, by a determiner executed by the processor, in response to analysing the second data, third data in accordance with the second data, wherein the third data is associated with migration of the first data to the at least one of the one or more storage devices.

8. The method of claim 7, further comprising:
gathering the second data, wherein the second data comprises fourth data associated with usage of the first data and fifth data associated with a storage state of the one or more storage devices and wherein the second data comprises historical data.

9. The method of claim 7, further comprising:
generating, in response to determination of the third data, a first instruction associated with the third data.

10. The method of claim 9, further comprising:
transmitting the first instruction to a storage controller in the storage system, wherein the storage controller is operable to use the first instruction to implement the policy, wherein the storage controller is operable to use the first instruction to at least one of: migrate the first data, retain the first data, power up a storage device, or power down the storage device in order to implement the policy, wherein the third data is associated with migration of the first data from a first storage device in the one or more storage devices to at least one second storage device in the one or more storage devices, and wherein the third data further comprises a migration time period associated with migration of the first data from the first storage device to the at least one second storage devices.

11. The method of claim 9, further comprising:
feeding back fourth data associated with implementation of the policy.

12. The method of claim 7, wherein the policy comprises an associated time period parameter and wherein the first parameter comprises at least one of: a performance parameter, a security parameter, or a reliability parameter.

13. A computer program product comprising a computer recordable medium having a computer readable program recorded thereon, wherein the computer readable program, when executed on a computing device, causes the computing device to:
receive first user input identifying a selection of one or more virtual disks for which to migrate the first data;
receive second user input identifying a power management parameter and a first parameter, wherein the power management parameter and the first parameter are numerical values in a set of numerical values of 0 to 100 and wherein the sum of the power management parameter and the first parameter equal 100;
generate a power-management policy using the power management parameter and the first parameter;
generate a rule based on the power management policy generated using the power management parameter and the first parameter;
analyse, in response to receiving the power-management policy, second data associated with the one or more virtual disks in accordance with the rule in order to identify the first data;
identify at least one of the one or more storage devices to migrate the first data to in accordance with the first rule; and
determine, in response to analysing the second data, third data in accordance with the second data, wherein the third data is associated with migration of the first data to the at least one of the one or more storage devices.

14. The computer program product of claim 5, wherein the computer readable program further causes the computing device to:
gather the second data, wherein the second data comprises fourth data associated with usage of the first data and fifth data associated with a storage state of the one or more storage devices and wherein the second data comprises historical data.

15. The computer program product of claim 5, wherein the computer readable program further causes the computing device to:
generate, in response to determination of the third data, a first instruction associated with the third data.

16. The computer program product of claim 15, wherein the computer readable program further causes the computing device to:
transmit the first instruction to a storage controller in the storage system, wherein the storage controller is operable to use the first instruction to implement the policy, wherein the storage controller is operable to use the first instruction to at least one of: migrate the first data, retain the first data, power up a storage device, or power down the storage device in order to implement the policy, wherein the third data is associated with migration of the first data from a first storage device in the one or more storage devices to at least one second storage device in the one or more storage devices, and wherein the third data further comprises a migration time period associated with migration of the first data from the first storage device to the at least one second storage devices.

17. The computer program product of claim 15, wherein the computer readable program further causes the computing device to:
feed back fourth data associated with implementation of the policy.

18. The computer program product of claim 13, wherein the policy comprises an associated time period parameter and wherein the first parameter comprises at least one of: a performance parameter, a security parameter, or a reliability parameter.

* * * * *